United States Patent [19]

Ruegg et al.

[11] 4,190,967
[45] Mar. 4, 1980

[54] KEYBOARD ATTACHMENT SYSTEM AND METHOD FOR KEYBOARD TRAINING

[76] Inventors: Robert J. Ruegg, 4 Foley Pl., Huntington Station, N.Y. 11746; Elliott P. Smith, 2908 Mattahoon Rd., Wilmington, Del. 19808

[21] Appl. No.: 914,587

[22] Filed: Jun. 12, 1978

[51] Int. Cl.² ............................................. G09B 13/04
[52] U.S. Cl. ............................................. 35/6; 35/8 A
[58] Field of Search ............... 35/5, 6, 8 R, 8 A, 9 R, 35/9 A, 9 B, 48 R, 14

[56] References Cited

U.S. PATENT DOCUMENTS

| | | | |
|---|---|---|---|
| 3,270,438 | 9/1966 | Ephraim | 35/48 R |
| 3,460,270 | 8/1969 | Butz et al. | 35/6 |
| 3,501,851 | 3/1970 | Price et al. | 35/9 A |
| 3,516,176 | 6/1970 | Cleary et al. | 35/9 A X |
| 3,538,622 | 11/1970 | Zadig | 35/9 A |
| 3,584,396 | 6/1971 | Hannah et al. | 35/9 A |
| 3,654,619 | 4/1972 | Tishman | 35/6 |
| 3,660,912 | 5/1972 | LaPlume | 35/9 A |
| 3,664,036 | 5/1972 | Boswell et al. | 35/6 |
| 3,818,608 | 6/1974 | Bell | 35/8 A |
| 3,894,346 | 7/1975 | Ward et al. | 35/6 X |
| 3,905,128 | 9/1975 | Koizumi et al. | 35/8 A |
| 4,044,475 | 8/1977 | Fujisawa et al. | 35/6 |

*Primary Examiner*—Vance Y. Hum
*Attorney, Agent, or Firm*—John C. Dorfman

[57] ABSTRACT

A student learning to use a keyboard device is given brief instruction and then uses the keyboard. The instruction includes a final predetermined key or keyboard element manipulation, which completes instructions to signal the initiation of new instructions. The instructions and operational signals can be recorded together on a two-track record, such as magnetic tape, so that the instructions are coordinated with the system actuating signals. The system is manually started and introductory material is presented from the record. After instructions are given, a signal starts a clock to measure the elapsed time for performance of instructions. The clock is terminated by a system actuating signal following execution of the last instruction. In the preferred system, actuation of the predetermined key will initiate the record drive which will be stopped after each unit of instruction is given by an appropriate signal on the other track, different from the ones actuating the clock. Thus, student controlled responses combined with accurate timing of the activities completed is achieved.

32 Claims, 7 Drawing Figures

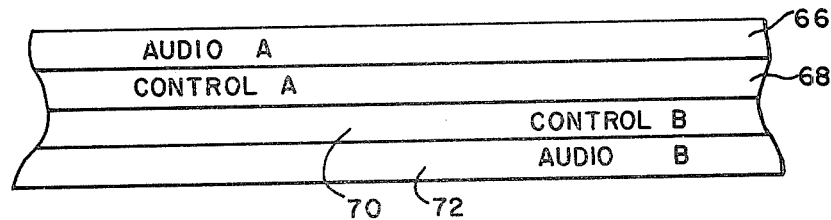
FIG. 4
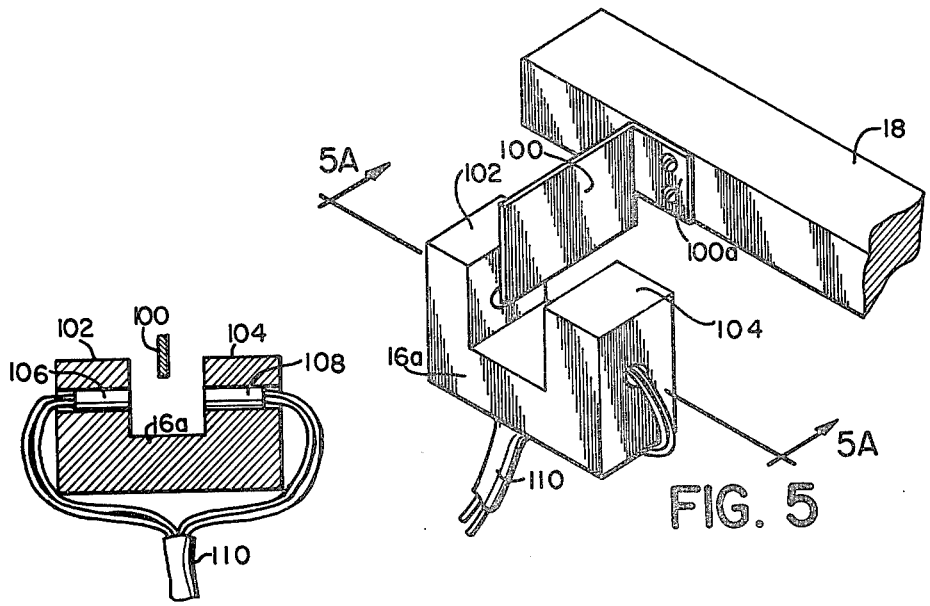
FIG. 5
FIG. 5A
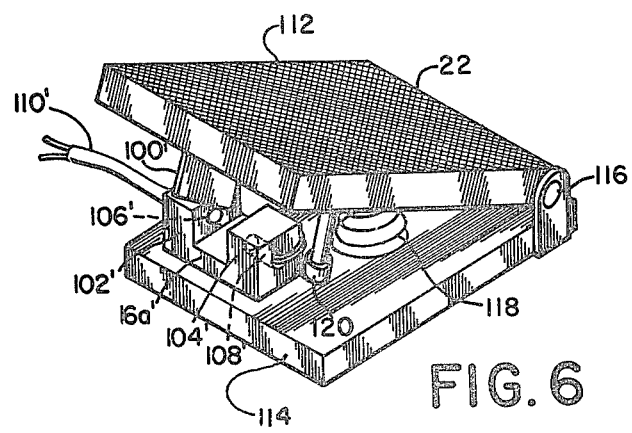
FIG. 6

KEYBOARD ATTACHMENT SYSTEM AND METHOD FOR KEYBOARD TRAINING

BACKGROUND OF THE INVENTION

The present invention relates to a system and a method for keyboard training. The system is an improvement on systems of the prior art in that it allows the student to proceed with his work at his own pace and initiate the next in a sequence of instructions when he has completed the previous instructions. Thus, it has other benefits enabling the coordination of a number of aids in connection with keyboard training.

In the classical classroom keyboard training system, the typing class has an instructor who gives the entire class instructions at the same time. Each keyboard learner begins with a different set of basic skills (reading, spelling, etc.), objective, learning styles, rates of achievement, and motivation. It is for this reason so many learners in traditional "lock-step" keyboard learning settings become frustrated. Some of the factors which cause frustration are that the keyboard keys are introduced too fast; the typing copy in the next is beyond the learner's reading level; the volume of copy on a page represent too heavy a performance load; and there is little opportunity for individualized presentation or "one-on-one" teacher/learner interaction. The labor intensive cost of individual instruction to avoid such problems in most cases is prohibitive.

The applicants are aware of a single U.S. patent in this field, U.S. Pat. No. 3,818,608, June 25, 1974, relating to a Method for Practicing Shorthand. The system described in this patent provides a variable speed control for slowing down or speeding up instructions. Such technique might be used with the present invention or it might by completely omitted.

SUMMARY OF THE PRESENT INVENTION

The present invention relates to a system which can be used by individual students without outside assistance. It involves little more than ordinary use of a tape player. Once the record drive device is set and the start button is pushed to begin, the system will operate on its own without further intervention, except by express instruction. The student first listens to the initial instructions audibly recorded on a first record track. When the instructions are completed, a record stop signal, preferably on a second track of the record (or at least separately recorded from the audible instructions), causes the record to stop. The second track carrying system operating commands is arranged with sensing means attached to its output in such a way that it does not interfere with the student in any way, but when the assignment is completed, either through normal action in completing the assignment or through an assigned internal action, the signals generated restart the record drive. When the further instructions are completed, again the record stop signal is detected on the second track. The student continues to type until the instructions are completed, finishing with the final actuation of a predetermined key or other keyboard device.

An important feature of the invention is its ability to measure the time that a student requires to complete a lesson segment. The time is automatically measured and displayed to the student who uses this information to monitor training progress and motivate goal achievement. Timing is accomplished by a clock that is controlled by start, stop, and reset tone commands on the second track of the record, separate from the record stop signal. The clock starts upon command from a clock start signal at the beginning of a lesson segment and stops when the lesson segment is completed upon occurrence of a clock stop signal. Since student responses control the record movement and hence the length of time required to complete the lesson segment, a variable time is displayed on the clock as a function of the student's keyboard response speed. The clock is preferably automatically reset to zero time at the start of each timed lesson segment.

For the typewriter, the predetermined key is conveniently the space bar. Either the specific instructions include using the space bar, or general instructions may be provided, but the space bar must be actuated at the end of each typed response. This procedure to restart the record drive continues until the assignment is completed.

It is also possible to use the second track of the record to actuate visual aids such as, for example, a projector displaying a copy of written text or whatever is conceived to be appropriate. Additional signals on the second track can be used to change the visual display as instructions are presented.

It will be seen from the above that using the system to perform the method of the present invention, it is possible for the student to keep the lesson going without the intervention of a teacher, using only the prerecorded instructions. Furthermore, use of graded material at different levels will enable the student to advance in accordance with standards that may include both accuracy and time. When instructions include several depressions of the predetermined key, such as the space bar of the typewriter, this can be anticipated by building into the system an accumulator or counter device which will permit a certain number of counts to be accumulated before a signal is generated to restart the tape.

More specifically, in accordance with the present invention, there is provided a method of training a student in the use of a keyboard involving providing the student with the keyboard training device. All instructions are provided so that the student can hear them, including a final operating instruction, involving actuating a particular key or keyboard element. When timing the student, and this involves instruction, timing is terminated upon the student's exercise of the final instruction.

The system of the present invention relates to a system for keyboard training. It employs a sense-stimulating instructional device having sequential feed means for recorded instructional material, means responding to a signal associated with the recorded instructional material for periodically stopping the device, and means responsive to a predetermined start signal to restart the feed means. The system also requires start signal generating means connected to the sense-stimulating device to generate a start signal, including means associated with the training keyboard and responding to some predetermined action taken relative to the keyboard.

The system of the present invention contemplates being associated with other auxiliary timing and/or display devices. In a preferred embodiment, the system employs a tape drive for magnetic recording tape containing at least two tracks, with appropriate pickup means for each track. Therefore, one of the pickup means will pick up instructions in audible form and the other pickup means will pick up signals causing apparatus to operate in a particular way. Where there are alternative pieces of apparatus involved, a preferred way of keeping the signals separate is to use tone signals with different frequencies. Then, it is possible to distinguish between the tones with appropriate filters to achieve actuation of only the device intended to be operated by the particular tone frequency which is passed.

BRIEF DESCRIPTION OF THE FIGURES

For a better understanding of the present invention reference is made to the following drawings in which:

FIG. 4 is a diagram representing the arrangement of recording tracks on magnetic tape used in the playback and control component;

FIG. 5 shows in perspective one preferred type of space bar signaling device;

FIG. 5A is a sectional view taken along line 5A—5A of FIG. 5; and

FIG. 6 is a perspective view of a similar foot pedal type of signaling device.

DESCRIPTION OF THE SPECIFIC EMBODIMENT

Figure 1:
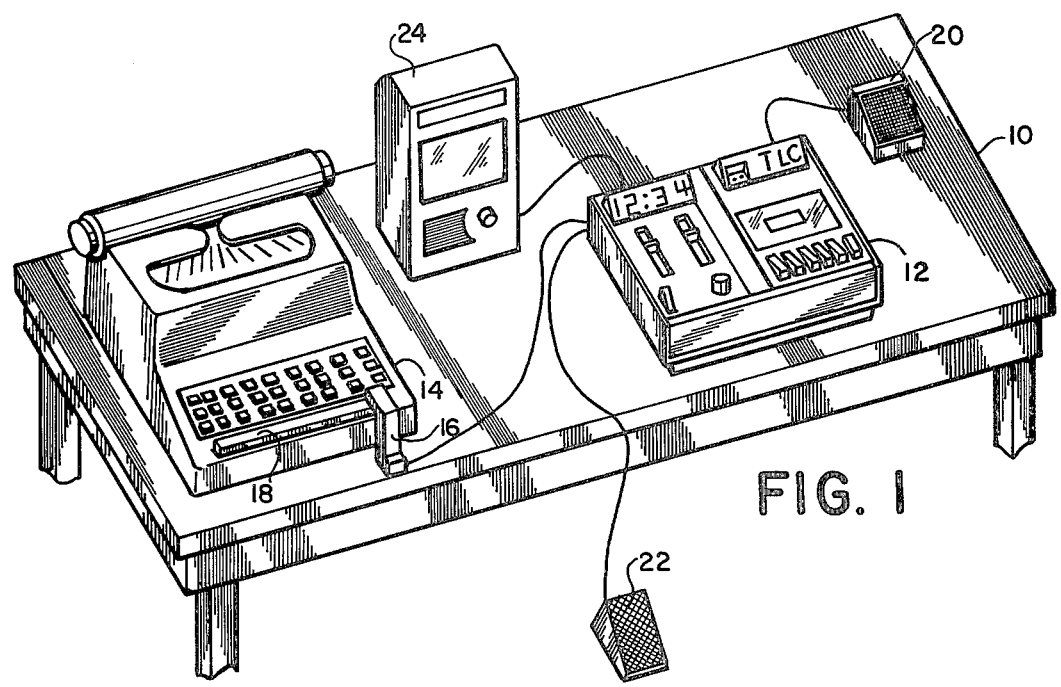
FIG. 1 is a perspective drawing of a preferred system of the invention showing the major components thereof.

Referring to FIG. 1, the system is illustrated as supported on table 10. Controlling the system is a special magnetic tape playback apparatus 12 which preferably also contains required control circuitry. In this instance the keyboard device to be mastered is a typewriter 14 which is provided with a detachable sensor switch device 16, which is associated with means attached to the typewriter space bar 18 to detect each depression of that bar.

A loud speaker 20 is connected to the audio output of control 12 for reproduction of the audio on magnetic tape cassettes inserted in the playback and control apparatus 12. The speaker 20 may be replaced by a headset for private listening if desired. A foot switch 22 may be used to control the playback apparatus alternatively in the same manner as the switch device 16 under certain conditions when the sensor switch 16 is not used or for test and training purposes without a keyboard device. A film strip viewer may be included and is connected to device 12 from which it receives actuation signals. Viewer 24 provides a visual display of instructional program materials.

Figure 2:
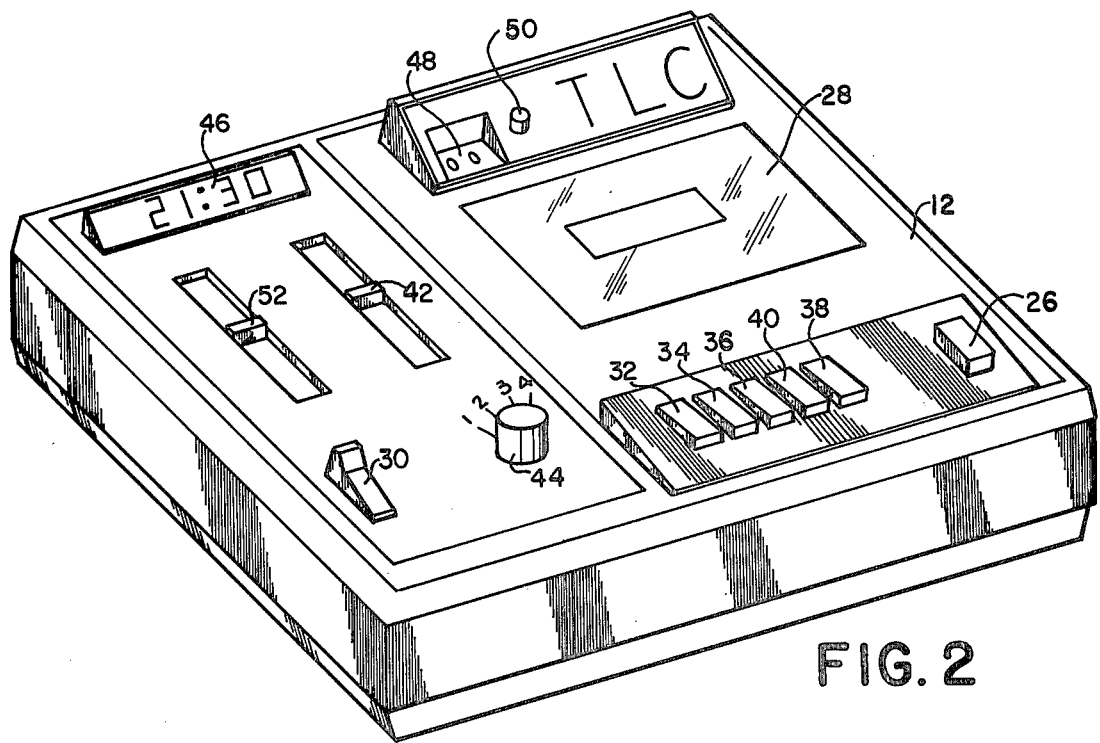
FIG. 2 is an enlarged perspective view of the playback and control component.

In FIG. 2 are seen the details of the playback and control apparatus 12 which uses conventional magnetic tape cassettes. Magnetic tape cassettes are inserted by depressing a cassett eject button 26 which unlatches cassette door 28 exposing the cassette receptacle into which the cassette is placed and the door manually closed. Power is supplied to the apparatus through a conventional power line (not shown) through switch 30. Selection switches 32, 34, 36 and 38 are employed in conventional circuits commonly used with tape decks to cause the conventional tape drive mechanism (not shown) to move the tape in reverse, fast forward, play, and stop modes, respectively, in an entirely conventional manner. Clear lever 40 controls switch means to reset the control circuits and clock.

Audio volume is adjusted by control 42. Selector 44 controls a signal accumulator, to be discussed hereafter, which determines whether the tape deck proceeds with the taped audio program, for example, after 1, 2, 3, or 4 space bar degressions. It is contemplated that in other versions the signal accumulator will be set in accordance with the recorded program instead of manually. In other models more than four depressions may be accumulated. The digital time clock 46 is automatically started by the recorded program and displays the elapsed time for certain lesson segments on the cassette tape. The clock may be programmed to start and stop in accordance with the taped program. A tape counter 48 can be set to "zero" at the start of each lesson segment by depressing the reset button 50. Subsequently, after completing a lesson the student can return to the beginning of the lesson segment by depressing rewind lever 32 until the tape counter returns to zero.

Figure 3:
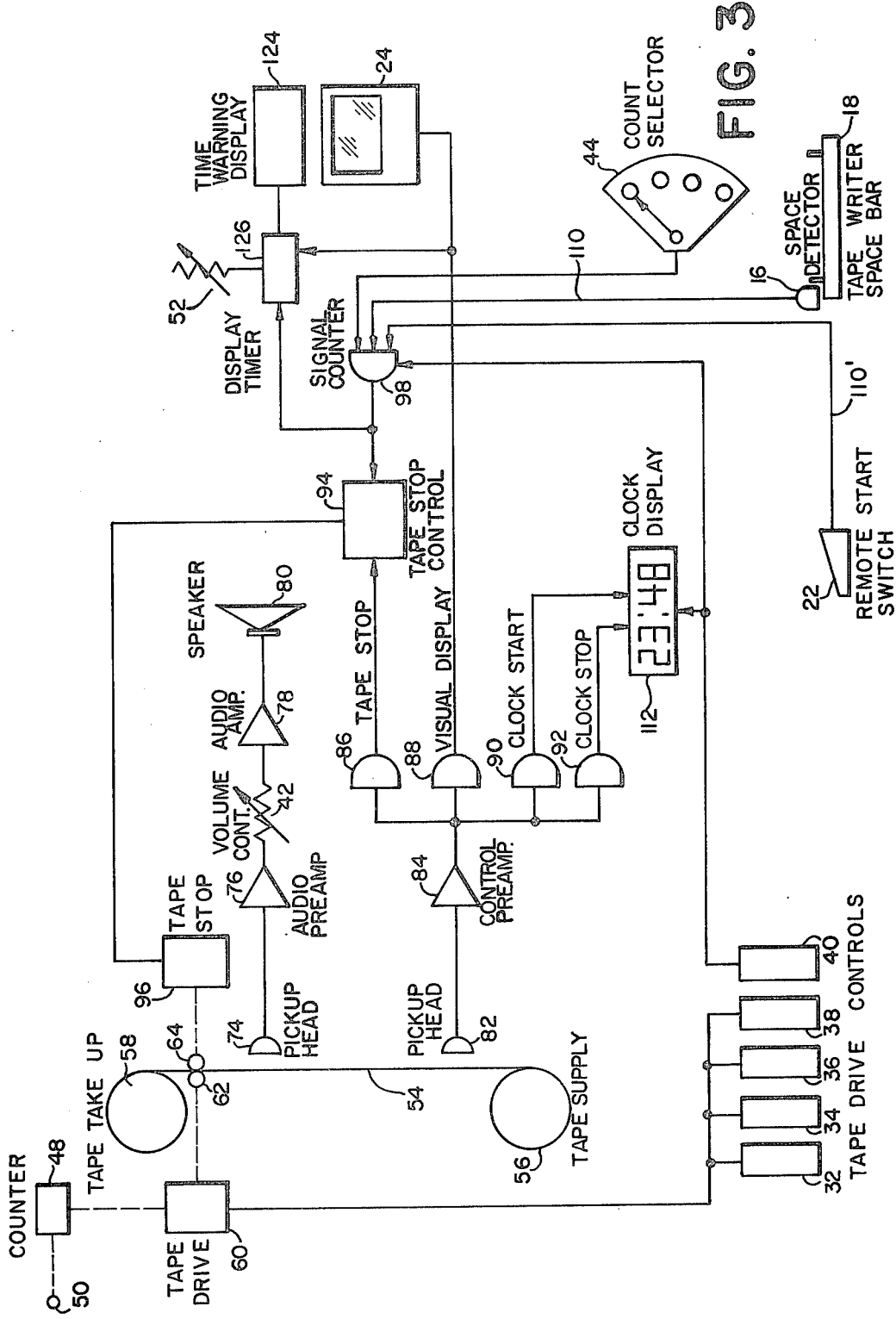
FIG. 3 is a schematic block diagram showing circuit interrelationships of the functional control elements.

FIG. 3 gives more insight into the functional operations of the system. Referring to FIG. 3 the magnetic recording tape 54, contained within a standard cassette, is driven between the supply spool 56 and takeup spool 58 by the tape drive motor and speed selector 60. Drive motor 60 drives capstan roller 62 against which pressure roller 64 is urged. The tape is fed between rollers 62 and 64 and driven thereby. Tape counter 48 is mechanically coupled to the tape drive to measure and display the amount of tape transported. Reset button 50 can be used to reset the counter to zero at any time. The direction and speed of the tape drive is conventionally controlled by the control levers previously described in connection with FIG. 2. Rewind lever 32 causes the tape to drive in reverse at fast speed. Fast forward lever 34 causes the tape to move at high speed in the forward direction. Play lever 36 causes the tape to drive forward at the normal speed, which preferably is 1⅞ inches per second. Stop lever 38 causes the tape to stop, preferably using a brake, releases any of the other tape control levers and causes the pressure roller to disengage from the drive and permit the tape to stop.

FIG. 4 represents a section of the magnetic recording tape 54 and illustrates that this particular tape provides four tracks upon which information can be magnetically recorded. The playback apparatus uses two of these tracks, 66 and 68 or 70 and 72, in conjunction with one another at any one time. Tracks 66 and 68 used in conjunction with one another constitute program side A of the cassette when it is inserted in the playback apparatus. Tracks 70 and 72 used in conjunction with one another constitute program side B of the cassette. Track 66 contains an audio program coordinated with control signals on track 68. Likewise, track 72 contains an audio program while track 70 is used for coordinated control.

Referring again to FIG. 3, the audio signal on the magnetic tape in A track 66 or B track 72 is detected by pickup head 74 and is amplified by preamp 76. The signal level is adjusted by volume control 42, then further amplified by the audio output amplifier 78 which drives the loud speaker 80. Simultaneously, control tone signals on the A control track 68 or the B control track 70 are detected by pickup head 82. These signals are amplified by the preamplifier 84 and directed simultaneously to the control signal tone detectors 86, 88, 90 and 92. Each one of these tone detectors is adjusted to respond to a single discrete tone frequency. For instance, in this particular example, "stop" tone detector 86 is activated only by a tone of 695 hertz and ignores all other frequencies. Visual display tone detector 88 is activated by a 460 hertz tone, clock start tone detector 90 is activated by a 1000 hertz tone and clock stop tone detector 92 responds only to a 310 hertz tone. Other tone frequencies could be used providing that the tone frequencies recorded on the tape correspond to the tone frequencies detected by the tone detectors of the playback apparatus.

Stop tones are recorded on the magnetic tape where appropriate, depending on the specific program recorded on the audio track. Each time a stop tone is detected by the stop tone decoder 86 a signal is sent to the tape stop control 94. The tape stop control actuates the tape stop solenoid 96 which lifts the pressure roller 64 away from the magnetic tape 54 and drive capstan 62 causing the tape movement to stop. At the same instant a brake is applied to the takeup drive 58 insuring an immediate halt in the tape movement without creep. The tape stop solenoid 96 will remain energized and the tape will remain stationary until the tape stop control 94 receives either a clear signal from the manually actuated "Clear" lever 40 or a restart signal from a signal counter 98.

The space bar counter 98 is controlled by accumulator control selector 44 which can be set to count 1, 2, 3, or 4 inputs. The number of counts is illustrative only and within the scope of the invention any number of counts can be selected if an appropriate count selector mechanism is provided. The input to space bar counter 98 is activated each time the space bar lever 18 on the typewriter 14 is depressed. FIG. 5 shows a simple preferred form of space detector. An opaque, thin, lightweight vane serves as a light interruptor element. Vane 100 is provided with an L flange 100a to enable its attachment to the typewriter space bar 18 by screws, adhesive or other conventional means in such a manner and location as not to interfere with the normal typewriter operation. Vane 100 and U-shaped structure 16 clipped onto and supported in fixed position by the frame of typewriter 14 together constitute the sensor switch 16. Downward movement of the vane 100 interrupts a light beam link between the legs of U-shaped structure 16a. Each time the space bar is depressed the vane 100 moves down with the space bar to a position between the upright posts 102 and 104 of the U-shaped structure 16a of the clip on space bar sensor. Post 102 contains a light emitting diode (LED) 106 or other appropriate light source. The other post 104 contains a photosensor 108, preferably a solid state type. Movement of the vane 100 into the light path causes interruption of the light path between LED 106 and photosensor 108 and the interruption is repeated each time the space bar 18 is depressed. This action generates a square wave electrical signal which is transmitted to the space bar counter 98 by the interconnecting cable 110 which also supplies power to the LED 106 and photosensor 108.

In some applications a separate manually operated switch is provided. This switch is preferably a foot operated switch 22 as seen in FIG. 3. Such switch is used instead of, or in conjunction with, the space bar detector 16. The foot operated switch 22 shown in greater detail in FIG. 6 has parts similar to those of the space bar detector seen in FIG. 5A and functions in a similar manner to the space bar detector 16. A U-shaped support structure 16a' provides a light emitting diode 106' supported in column 102' in FIG. 6 and photodetector 108' supported in column 104' as shown in FIG. 6. The light path between LED 106' and photodetector 108' is interrupted by vane 100'. In this instance, vane 100' is supported on a foot pedal 112 pivotally connected to base 114 by hinge 116. Return spring 118 urges pedal 112 away from base 114 and withdraws the vane 100' from the light path between the LED 106' and photodetector 108' when foot pressure is removed from pedal 22. Stop means 120 limits the distance the pedal 112 can be depressed toward the base but permits the vane 100 to interrupt the beam. Signals from the foot switch 22 are of the same square wave type generated by the spacebar detector 16 and are similarly conducted to the signal counter 98 by interconnecting cable 100'.

Referring again to FIG. 3 the digital clock display 112 is controlled by the clock start tone detector 90, stop tone detector 92 and manual clear lever 40. Whenever a clock start tone recorded on the control track of the magnetic tape is detected by the clock start tone detector 70 the clock will automatically reset to zero time and then immediately start counting seconds and minutes. The clock continues to measure time until a clock stop pulse tone on the magnetic tape is detected by the clock stop tone decoder 92. Once the clock is started it will continue to run until a clock stop tone is received and is not influenced by the start/stop action of tape drive controls described previously. When a clock stop tone is detected and the clock stops the clock will continue to display the elapsed time from clock start signal to stop signal.

With each subsequent clock start tone detected the clock will reset to zero and immediately start counting. When it is desired to reset the clock to display a zero count, this is done by recording a clock start tone on the tape followed immediately by a stop tone. If this sequence is done within one second, the clock will be held to a zero count. Alternatively, the clock can be manually reset to zero by depressing the clear lever 40. Each time a clock start tone is detected, in addition to resetting the clock display to zero, the space bar counter 98 is also set to zero count. This function serves to clear the signal counter at the start of each recorded lesson segment.

The visual display 24 is controlled by a separate tone code recorded on the control channel. When a tone code signal is picked up by the control channel pickup head 82 and is amplified by the control channel preamplifier 84, the Visual Display control signals are selectively detected by the visual display tone decoder 88. The detected visual display signal is directed to the visual display 24. The visual display 24 is typically a remotely controlled film strip projector in this application and each time it receives a visual display signal it will advance the film one frame to present a new projected image frame or, in some cases, a blank image frame to the student. A unique feature of the visual display is the Display Time Warning Indicator 124. This is a visual annunciator that is illuminated after a predetermined time following each tone controlled film frame advance of the visual display. The display warning light 124 is controlled by the display timer 126. The display warning time control 52 is manually set to determine the time interval of the display timer 126. Each time a visual display command signal is received from the visual display tone decoder 88 the display timer 126 starts a timing cycle. The annunciator 124 will remain off until the time cycle interval selected by the display warning time control 52 is completed at which point the time warning annunciator will become illuminated and remain illuminated until a reset signal is received from the space bar counter 98. The reset signal turns off the display time warning annunciator 124 and the display timer 126. If the reset signal is received before the timer completes its cycle, the timer will be turned off and the time warning annunciator will not be illuminated. The display warning time control 52 can be manually set to display the warning after a suitable time delay determined by the instructional programming or when set to the off position will disable the display time warning annunciator.

We claim:

1. A keyboard attachment system for keyboard training for use in conjunction with any existing keyboard device having an actuatable element designated to indicate end of response and means for providing a pre-set number of actuations of said designated element comprising, sequential feed means for recorded instructional material, means responding to a signal associated with recorded instructional material for periodically stopping the device, and start signal generating means connected to the sense stimulating instructional device to generate a start signal in response to said pre-set number of actuations of the designated element including means attachable to keyboard device and actuatable by the normal use of the designated actuatable element in conventional keyboarding activity.

2. The system of claim 1 in which the sense stimulation device produces from the recorded instructional material instructions which are, at least in part, audible and means to reproduce the audible instructions.

3. The system of claim 2 in which the recorded instructional material is on magnetic tape and the feed means is a tape drive so that an audible signal is derived by magnetic tape pick-up means for monitoring at least two tracks of the magnetic tape, one to reproduce audible instructions and another to detect the procedural signals, including at least one for predetermined stopping of the tape drive.

4. The system of claim 3 in which the elapsed time warning annunciator will reset upon predetermined student response at the keyboard.

5. The system of claim 1 in which start signal generating means includes a count accumulator responsive to and accumulating the number of actuations of the designated element and adjustable to permit a preselected number of keyboard actions before the start signal generating means is activated.

6. The system of claim 6 in which a count selector is provided in combination with a count accumulator to select and determine how many counts will be accumulated in the count accumulator before the start signal generating means generates a start signal.

7. The system of claim 1 in which the signal start generating means includes a change of state means which is actuated by action of the keyboard operator.

8. The system of claim 7 in which the signal start generating means is a photoelectric device employing a light source and a photodetector and means actuatable by the keyboard operator alternatively to interrupt and pass the light beam to generate a photodetector signal at two levels.

9. The system of claim 7 in which the change of state means includes a pedal actuated device which is in one state when the pedal is depressed and the other when the pedal is released.

10. The system of claim 7 in which the change of state means includes means attachable to some element of the keyboard device to be actuated into a change of state when that element is actuated.

11. The system of claim 10 in which the selected keyboard device for use with the system has a typewriter-type keyboard in which keys are movable relative to a frame and is provided with, as the designated element, a space bar for use between words or to otherwise provide a space between adjacent characters, and the change of state device is attachable to the frame of the keyboard and to the space bar so that relative movement between the frame and space bar will produce a change of state.

12. The system of claim 11 in which the signal start generating means is a photoelectric device employing a light source and a photodetector means actuatable by the keyboard operator alternatively to interrupt and pass the light beam to generate a photodetector signal at two levels.

13. A keyboard attachment system for keyboard training for use in conjunction with any existing keyboard device having an actuatable element designated to indicate end of response and means for providing a pre-set number of actuations of said designated element comprising, an audio playback device having record drive means for a record means, pickup means for at least two tracks on the record means as the record means is moved by the drive means, one of which tracks provides audible sequential instructions and another of which tracks provides system operating signals, record stop means responsive at least to operating signals from the record means to stop the record drive means, record start means including means to cause the record to be moved by the drive means, start signal generating means connected to the record drive means to generate in response to said pre-set number of actuations of the designated element a start signal, including means attachable to the keyboard device and actuatable by the normal use of the designated actuatable element in conventional keyboarding activity, and a sound reproducing means connected to the pickup for the track providing audible instructions for reproducing the recorded audible instructions in response to the start signal.

14. The system of claim 13 in which the system also employs a visual display and means to initiate and control change of said display of the visual responsive to actuation by selected signals carried on the record means which are collected by pickup means connected to the display.

15. The system of claim 14 in which the record means also provides a clock stop signal and pickup means detecting such signal is connected to the clock stop means.

16. The system of claim 13 in which the system employs a visual display clock having clock start and stop means responsive to selected signals and the record means also provides at least a clock start signal and pickup means is connected to the clock start means.

17. The system of claim 13 in which there are multiple operating functions to be performed and the signal controlling each one is an audible signal of different frequency recorded on a common track of the record means, the audioplayback device uses the same pickup to detect all such signal frequencies and frequency discriminating means are used to separate the frequency signals used to initiate each of the operating functions.

18. The system of claim 17 in which the audio-playback device uses record means in the form of magnetic tape having a track on which audible tone signals are recorded in positions relative to recorded instructions on another track.

19. The system of claim 13 in which a visual display device is subject to a start signal from the audio playback device system operating signals.

20. The system of claim 19 in which the start signal is a tone frequency detected by the audio playback device and the start mechanism for the visual display device is a tone frequency responsive device.

21. The system of claim 13 in which the record stop means includes a solenoid controlled mechanism responsive to a distinctive tone frequency detected by a pickup means from one of the record tracks.

22. The system of claim 13 in which clock means with an elapsed time display is provided to be started on a predetermined start signal and stopped upon a predetermined stop signal.

23. The system of claim 22 in which the visual display starts in response to a distinctive tone frequency detectable by pickup means from one of the record tracks.

24. The system of claim 13 in which an elapsed time warning annunciator is provided and is actuated by a separate timing means after predetermined elapsed time.

25. The system of claim 24 in which means is provided to selectively vary the amount of elapsed time before the annunciator is actuated.

26. The method of training a student in the use of a keyboard device comprising,
providing a student with a device for attachment to any existing keyboard device having an actuatable element,
designating said actuatable element to indicate end of response,
setting a number of actuations of the designated element,
providing dictation for the student to use the keyboard device including a final operation involving actuating the designated keyboard element,
timing the student in his exercise of the instructions,
terminating timing upon the student's completion of a timed learning segment.

27. A method of claim 26 in which operation of the particular key in the exercise of final instruction generates a signal which is used to initiate new instructions.

28. The method of claim 27 in which the particular key or other keyboard element may be actuated a predetermined number of times before performing the final instruction, counting the actuations, and generating the signal upon the last of the predetermined number of actuations.

29. The method of claim 27 in which additional oral instructions are provided and the method of signaling termination and repetition of new instructions is repeated.

30. The method of claim 29 in which operation of visual displays is coordinated with signals generated by actuation of the particular key or other keyboard element.

31. The method of claim 30 in which timer means started upon completion of first instructions is periodically stopped in response to signals generated by actuation of the particular key or other keyboard element and restarted upon completion of each subsequent instruction.

32. The method of claim 30 in which an elapsed time warning notifies the student that a predetermined amount of elapsed time has expired as recorded by the timer means.

* * * * *

UNITED STATES PATENT AND TRADEMARK OFFICE
CERTIFICATE OF CORRECTION

PATENT NO. : 4,190,967
DATED : March 4, 1980
INVENTOR(S) : Robert J. Ruegg and Elliott P. Smith It is certified that error appears in the above-identified patent and that said Letters Patent are hereby corrected as shown below:

Claim 6, line 1, "6" should be --5--.

Signed and Sealed this

Third Day of March 1981

[SEAL]

Attest:

RENE D. TEGTMEYER

Attesting Officer

Acting Commissioner of Patents and Trademarks